United States Patent [19]

Foss

[11] Patent Number: 5,011,898
[45] Date of Patent: Apr. 30, 1991

[54] ACRYLIC AMPHOTERIC POLYMERS

[75] Inventor: Robert P. Foss, Hockessin, Del.

[73] Assignee: E. I. Du Pont de Nemours and Company, Wilmington, Del.

[21] Appl. No.: 343,773

[22] Filed: Apr. 27, 1989

Related U.S. Application Data

[62] Division of Ser. No. 176,806, Apr. 1, 1988, abandoned, which is a division of Ser. No. 377,373, May 12, 1982, Pat. No. 4,943,888.

[51] Int. Cl.$^5$ .............................................. C08F 2/00
[52] U.S. Cl. ............................... 526/234; 526/236; 526/237; 524/714
[58] Field of Search ............... 526/234, 236, 237; 524/714

[56] References Cited

U.S. PATENT DOCUMENTS

| | | | |
|---|---|---|---|
| 2,592,107 | 4/1952 | Azorlosa | 260/80.5 |
| 3,658,772 | 4/1972 | Volk | 526/234 |
| 3,689,470 | 9/1972 | Shachat et al. | 260/86.1 |
| 3,692,753 | 9/1972 | Smith et al. | 260/79.7 |
| 3,706,564 | 12/1972 | Hollister et al. | 526/312 |
| 3,749,577 | 7/1973 | Hollister et al. | 96/114 |
| 3,790,533 | 2/1974 | Samour | 260/78.5 |
| 3,808,158 | 4/1974 | Bolio | 260/2.1 |
| 3,813,251 | 5/1974 | Hollister et al. | 96/114 |
| 3,853,803 | 12/1974 | Anderson et al. | 260/29.6 |
| 3,941,724 | 3/1976 | Bolto | 526/312 |
| 3,950,294 | 12/1972 | Hollister et al. | 526/312 |
| 3,950,296 | 4/1976 | Kangas | 526/312 |
| 3,950,398 | 4/1976 | Klein | 260/486 |
| 3,957,492 | 5/1976 | Miyazako et al. | 96/114 |
| 3,985,698 | 10/1976 | Matsudaira et al. | 260/29.6 |
| 4,075,131 | 2/1978 | Sterling | 252/542 |
| 4,091,165 | 5/1978 | Hayama | 428/408 |
| 4,293,635 | 10/1981 | Flint et al. | 430/271 |

FOREIGN PATENT DOCUMENTS 889760 2/1962 United Kingdom .

OTHER PUBLICATIONS

Merle et al. *Synthetic Polyampholytes. Z. Sequence Distribution in Methacrylic Acid. (Dimethylamino)ethyl Methacrylate Copolymers by $^{13}C$ NMR Spectroscopy*, Macromolecules 1982, 15, 360–365.

Primary Examiner—Joseph L. Schofer
Assistant Examiner—Peter D. Mulcahy

[57] ABSTRACT

Amphoteric polymers prepared by polymerization of (a) acrylic acid, (b) N,N-dimethyl- or N,N-diethylaminoethyl methacrylate and, optionally, (c) esters of methacrylic or acrylic acid prepared by (i) emulsion polymerization of (b), (c) and the methyl ester of (a), followed by basic hydrolysis, or (ii) polymerization of (a), (b) and (c) in the presence of a strong acid, and photographic emulsions comprised of said polymers in which the molar ratio of (a) to (b) is at least 2 to 1 and a silver halide.

4 Claims, No Drawings

ACRYLIC AMPHOTERIC POLYMERS

This is a division of U.S. application Ser. No. 176,806, filed Apr. 1, 1988 now abandoned, which was a divisional U.S. application Ser. No. 377,373 filed May 12, 1982 now U.S. Pat. No. 4,943,888.

FIELD OF THE INVENTION

This invention relates to acrylic amphoteric polymers and in the use of certain such polymers as photographic gelatin replacements or extenders.

BACKGROUND INFORMATION

Synthetic amphoteric polymers are useful in various applications, often as protein substitutes. Sterling, U.S. Pat. No. 4,075,131, discloses a conditioning shampoo containing a zwitterionic polymer which may be prepared by direct polymerization of acidic and basic monomers, e.g., acrylic acid and a dialkylaminoalkyl methacrylate.

Matsudaira et al., U.S. Pat. No. 3,985,698, disclose an acrylic resin for paints prepared from ethylenically unsaturated monomers having tertiary amine groups, e.g., N,N-diethyl- and N,N-dimethylaminoethyl methacrylate; ethylenically unsaturated monomers having carboxyl groups, e.g., acrylic acid; and acrylate or methacrylate esters.

Samour, U.S. Pat. No. 3,790,533, discloses pressure sensitive adhesive polymers comprised of certain carboxylic acid vinyl monomers, e.g., acrylic acid; an aminoalkyl acrylate or methacrylate, e.g., dimethylaminoethyl methacrylate; and an alkyl acrylate. Anderson et al., U.S. Pat. No. 3,853,803, disclose similar amphoteric polymers which are useful for producing crosslinkable, electrodepositable films and a technique for direct polymerization of these monomers with minimal reaction between the amino and carboxyl groups.

Synthetic amphoteric polymers have been used in photographic silver halide emulsions. Hollister et al., U.S. Pat. No. 3,749,577, disclose such a use for polymers prepared by direct polymerization of monomers having a carboxyl functionality, e.g., acrylic acid, and monomers having a quaternary ammonium functionality. U.S. Pat. No. 3,813,251 discloses such a use for similar polymers having a tertiary ammonium functionality.

Flint et al., U.S. Pat. No. 4,293,635, disclose a photosensitive composition comprising an amphoteric polymer which is an interpolymer of alkyl acrylamides, methacrylamides, aminoalkyl acrylates or methacrylates; acids, including acrylic and methacrylic acids; and acrylate or methacrylate esters.

Klein, U.S. Pat. No. 3,950,398, discloses water-soluble acid addition salts of methacrylic acid and 2-mono-(lower)alkyl-aminoethyl methacrylate in a molar ratio of 1.5:1 to 1:1.5. The salts can be homopolymerized to prepare amphoteric polymers or copolymerized.

Miyazako et al., U.S. Pat. No. 3,957,492, disclose a photographic emulsion which contains an amphoteric copolymer having morpholinyl-substituted alkylacrylamide groups and carboxylic metal salt groups and which can be used as a partial or complete gelatin replacement.

Smith et al., U.S. Pat. No. 3,692,753, disclose a silver halide emulsion comprising amphoteric polymers of, e.g., N,N-dimethyl- and N,N-diethylaminoethyl methacrylate, acrylic acid, and acrylamides or acrylates having thioalkyl groups in the alkyl chain.

In U.K. Patent Specification 889,760 are disclosed light-sensitive emulsions comprising amphoteric polymers prepared by hydrolysis of polymers containing groups capable of producing acidic and basic groups on hydrolysis.

Azorlosa, U.S. Pat. No. 2,592,107, discloses that amphoteric polymers can be prepared by hydrolysis of polymers of amines containing a vinyl radical or an N-acyl derivative thereof and vinyl, vinylidene or vinylene compounds containing potential acid-forming groups, e.g., esters of acrylic acid.

Shachat et al., U.S. Pat. No. 3,689,470, disclose a method of preparing polymers which contain a betaine-type group by direct polymerization of a tertiary amine-containing monomer and acrylic acid or aqueous methyl acrylate.

DISCLOSURE OF THE INVENTION

For further comprehension of the invention and of the objects and advantages thereof, reference may be had to the following description and to the appended claims in which the various novel features of the invention are more particularly set forth.

The invention resides in an amphoteric polymer comprised of the following monomers:

(a) acrylic acid, (b) N,N-dimethylaminoethyl methacrylate, or N,N-diethylaminoethyl methacrylate and, optionally, (c) a $C_{1-8}$ alkyl acrylate or methacrylate, 2-hydroxyethyl acrylate or methacrylate or 2-hydroxypropyl acrylate or methacrylate, prepared by (i) polymerization, preferably emulsion polymerization, of monomers (b) and, optionally, (c) and the methyl ester of (a) followed by selective hydrolysis of the resulting prepolymer or (ii) polymerization of (a), (b) and, optionally, (c) in the presence of a strong acid in a quantity sufficient to protonate the amine group of (b).

The amphoteric polymers prepared by said processes are substantially free of any betaine-type contaminant. Therefore, the invention can also be said to reside in an amphoteric polymer comprised of monomers (a), (b) and (c) which is substantially free of betaine-type contaminants.

The invention also resides in a photographic emulsion comprising said amphoteric polymer in which the molar ratio of (a) to (b) is at least 2 to 1 and a silver halide and in the above-described processes for preparing the amphoteric polymers of the invention.

By "comprises" is meant that the presence of other components which do not significantly adversely affect the invention are not precluded, e.g., sensitizers, surfactants, stabilizers and dyes. By "resulting prepolymer" is meant the preliminary polymer obtained by polymerization of monomers (b) and, optionally, (c) and the methyl ester of (a), which is electively hydrolyzed to the amphoteric polymer of the invention.

The amphoteric polymers (polyampholites) of the invention are useful in photosensitive compositions such as are used in photoresist applications. The polymers in which the molar ratio of (a) to (b) is at least 2 to 1 are useful as extenders and complete replacements for gelatin in photographic emulsions. The degree of polymerization is preferably about 50 to 300. Many of these polymers provide an increase in covering power when so used. Covering power is a measure of the amount of silver halide needed to produce an image. It is the reciprocal of the photometric equivalent, pE, which is equal to M/D, M being the mass of silver per unit area and D being the optical density, usually measured as diffuse density. Such polymers are preferably comprised of 20 to 90 mol % of (a), 10 to 30 mol % of (b) and 0 to 70 mol % of (c). Polymers in which the molar ratio of (a) to (b) is at least 2.5 to 1 are preferred because when used in a photographic emulsion, they are more readily redispersed in water at pH 6 after isoelectric precipitation at pH 4.

When tertiary amine-containing monomers are directly polymerized with acrylic or methacrylic acid monomers by conventional processes, betaine-type compounds are readily produced resulting in contamination of the polymer with such compounds. The reaction yielding such betaine-type compounds is described by Shachat et al., U.S. Pat. No. 3,689,470.

The amphoteric polymers of the invention can be prepared in two steps. First, a mixture of monomers (b) and (c) and the methyl ester of (a) are polymerized to yield a acrylate-containing prepolymer. Second, the acrylate ester groups are selectively hydrolyzed, in the presence of a base, to yield the amphoteric polymer of the invention having pendant carboxyl and dialkylaminoalkyl ester groups. This two-step procedure is an improvement in the polymerization of the monomers because the resultant polymer is substantially free of any betaine-type contaminant.

Preferably, the polymerization step is carried out by emulsion techniques because the reaction proceeds more rapidly in this manner than by solution techniques Emulsion polymerization can be carried out by known procedures, preferably using potassium persulfate as the polymerization initiator. Polymerization temperature is preferably about 50° to 70° C. although with a redox initiator system, e.g., potassium persulfate/N,N-dimethylaminoethanol, temperatures as low as about 0° C. can be used. The polymerization can be accomplished by batch or continuous processes. An expanding batch process with specific, gradual, controlled addition of monomer, initiator and emulsifier solution, and a continuous overflow process are preferred. Such procedures are more fully described in the Examples below.

During the hydrolysis step, acrylate ester groups are rapidly converted to carboxylate salt groups in the presence of a base. Since this hydrolysis reaction is several orders of magnitude faster than the corresponding hydrolysis of methacrylate ester groups, selective hydrolysis of the acrylate ester groups can be achieved. If a limiting quantity of base is used, hydrolysis will proceed only until the base is consumed. Hence the degree of prepolymer hydrolysis and therefore the ratio of carboxyl to dialkylaminoalkyl groups in the amphoteric polymer can be regulated by the relative quantity of base used.

Basic hydrolysis of the prepolymer is preferably carried out with aqueous potassium hydroxide, preferably in about a 10 to 20 percent solution of the base and preferably at a temperature of about 65° to 90° C. Neutralization of the hydrolyzed polymer can be accomplished with a strong acid, e.g., nitric acid, and the polymer can be separated from solution by isoelectric precipitation in excess water. The amphoteric polymer can be redissolved, after purification, at a pH other than the isoelectric point. Alternatively, polymer neutralization can be accomplished with an acidic ion-exchange resin. Slightly less than the calculated amount of resin is usually employed to facilitate separation of the amphoteric polymer solution which can be used directly, if desired.

Alternatively, the amphoteric polymers of the invention can be prepared directly in one step by polymerizing a mixture of the monomers in solution in the presence of a strong acid. The acid protonates the amine groups of (b), converting said groups to ammonium groups. Carrying out the polymerization of the monomers in the presence of the acid is an improvement in the polymerization because the ammonium groups do not form betaine-type compounds. Therefore, the polymer is substantially free of betaine-type compounds.

Useful acids include, for example, nitric acid, sulfuric acid and hydrochloric acid. A sufficient quantity is used to protonate the amine groups of (b). The polymerization is preferably carried out at about 50° to 70° C., using potassium persulfate as the initiator. As in the two-step procedure, the polymerization can be accomplished by batch or continuous processes. Preferably, (b) is added to the acid to insure complete protonation prior to addition of (a) and (c).

EXAMPLES

The following are illustrative examples of the invention in which all parts and percentages are by weight and all degrees are Celsius unless otherwise noted. The preferred embodiments are described in Examples 3, 19, 20 and 21. Polymer molecular weights are number average ($M_n$), weight average ($M_w$) and viscosity average ($M_v$) and were determined by gel permeation chromatography.

Polymer isoelectric points (pI) were determined by titration of a dilute polymer solution from the acidic and basic sides of the pI until cloudiness was observed. The pI was taken as the halfway point between the two cloud points. At the isoelectric point, the polymers are least water-soluble and precipitation of the polymers occurs.

All reactors and reservoirs were flushed with nitrogen, and solutions were maintained under a nitrogen atmosphere.

EXAMPLE 1

Preparation of Polyampholite by Bulk Single Batch Procedure

Apparatus: A jacketed resin kettle reactor was fitted with a reflux condenser, vibromixer stirrer, a thermometer and thermocouple probe, and a nitrogen addition tube.

Emulsifier and Initiator Solution: The emulsifier and initiator solution consisted of a mixture of 5.0 g of a phosphate ester anionic surfactant in acid form, pH=5, in 500 ml of water to which 0.5 g of potassium persulfate initiator had been added.

Feed Monomer: The feed monomer consisted of a mixture of 29 ml of dimethylaminoethyl methacrylate (0.165 mole) and 104 ml of methyl acrylate (1.153 moles).

Procedure-Polymerization: The emulsifier and initiator solution was charged to the reactor and heated to 60°. Then the feed monomer was added. The polymerization reaction temperature increased to about 76-78°. The reaction was continued for 1 hour. The product emulsion was coagulated by adding acetone until the emulsion broke. The coagulated polymer was decanted, washed with water and separated by filtration The polymer was dissolved in 500 ml of ethanol to give a solution weight of 753 g and a prepolymer yield, based on a solids content of 0.159 g/g solution, of 120 g (96% yield). Anal. Calcd. for 6 to 1 molar ratio of methyl acrylate to dimethylaminoethyl methacrylate: C, 57.06; H, 7.58; N, 2.08. Anal. Found: C, 56.43; H, 7.70; N, 1.94. The analysis shows that the molar ratio is 6.57 to 1.

A second batch of polymer was prepared by the same procedure. A total of 701 g of solution was obtained, and a prepolymer yield, based on a solids content of 0.159 g/g solution, of 112 g (89%) was obtained. Anal. Found: C, 56.44; H, 7.60; N, 2.01. The analysis corresponds to a monomer molar ratio of 6.27 to 1 of methyl acrylate-dimethylaminoethyl methacrylate. The polymer batches were combined; $M_w=48,600$; $M_v=44,000$.

Hydrolysis of prepolymer: A 21.8 g sample of the combined polymers (180 g of polymer solution) was partially hydrolyzed by heating with a solution of 8.6 g of potassium hydroxide in 100 ml of water at 80° for 0.75 hour. The reaction mixture was cooled to room temperature and partially neutralized to its pI by adding 38.3 g of an acidic cross-linked polystyrene sulfonic acid ion exchange resin having 2.4 meq H$^+$ per gram resin. This amount of resin corresponded to 0.092 equivalent of acid per 0.154 equivalent of base. The resin was washed successively with nitric acid and water before use. The reaction mixture was stirred for 30 minutes, filtered, and the polyampholite polymer solution was bottled; pI=4.3. The solution pH was 6.7. The polymer obtained corresponded to a monomer molar ratio of 5/1.43/1 of acrylic acid/methyl acrylate/dimethylaminoethyl methacrylate.

Preparation of (3.0/0.8/1) Acrylic Acid/Methyl Acrylate/Dimethylaminoethyl Methacrylate Polyampholite by Expanding Batch Procedure Apparatus: A jacketed resin kettle reactor was fitted with a reflux condenser, vibromixer stirrer, inlet tubes for addition of monomer, initiator, and emulsifier solutions, a thermocouple temperature probe, and thermometer. The reactor was also fitted with a drain tube to allow the removal of product emulsion following the completion of each batch. Monomer, initiator, and emulsifier were contained in separate reservoirs. The emulsifier reservoir was preheated via a circulating water bath to heat the emulsifier to the ambient reactor temperature before introducing it to the reactor. Monomer, initiator, and emulsifier solutions were fed into the reactor by metering pumps.

Emulsifier Solution: The emulsifier solution consisted of a mixture of 25 g of a phosphate ester anionic surfactant in acid form, pH=5.0, 25.0 ml of dimethylaminoethanol (DMAE) and 2500 ml of distilled water.

Initiator Solution: The initiator solution consisted of potassium persulfate, 5.0 g, dissolved in 500 ml of water.

Precharge Balance Monomer: A molar ratio of 6.73/1.0 of methyl acrylate/dimethylaminoethyl methacrylate was employed.

Feed Monomer: A molar ratio of 4.0/1.0 of methyl acrylate/dimethylaminoethyl methacrylate was employed.

Feed Pump Rates: The following pump rates were employed: monomer pump=3.56 ml/min; initiator pump=1.48 ml/min; emulsifier transfer pump=13.35 ml/min.

Procedure-Polymerization: Emulsifier solution, 500 ml, was placed in the reactor. The remainder was placed in the preheated emulsifier reservoir and both solutions were heated to 65°. When the temperature stabilized, the initiator pump was started and allowed to run for 10 min to provide a steady state radical concentration in the reactor. Such steady state concentration is achieved by constant addition of potassium persulfate to an excess of DMAE present in the reactor.

Precharge monomer, 50 ml, was added to the reactor. Immediately following the injection of the precharge monomer, the feed monomer pump was started. The temperature profile of the reaction was followed using a thermocouple and stripchart recorder. The temperature immediately dropped upon addition of the precharge monomer but rapidly recovered and continued to climb to a plateau of 68° where it remained throughout the reaction. For best results, it is important to correlate monomer feed rate with reaction rate.

After 125.0 g (134 ml) of monomer had been fed (1/4 of total feed monomer), the monomer pump was stopped and the product emulsion was dumped over ice. The initiator pump was allowed to continue pumping during this cycle. The reactor was then refilled with 500 ml of emulsifier solution from the reservoir and the reaction sequence described above was repeated three times. The combined product emulsions were coagulated by adding acetone followed by additional water. The coagulated prepolymer was decanted, washed with water, and dissolved in 1 liter of ethanol for conversion to polyampholite. A total of 562 g of solid prepolymer was obtained. Anal. Found: C, 56.83; H, 7.67; N, 2.85. Elemental and infrared analyses showed that the polymer contained a monomer molar ratio of 3.8/1 of methyl acrylate/dimethylaminoethyl methacrylate. $M_n=22,000$; $M_w=62,500$; $M_v=58,500$.

Hydrolysis: The prepolymer solution obtained in the polymerization step was transferred to a 4 liter resin kettle fitted with a blade stirrer, reflux condenser, thermometer, and addition funnel. The mixture was heated to 80° with a hot water bath. When the temperature stabilized, 198 g (3.54 moles) potassium hydroxide dissolved in 1000 ml water was added over a 1 hour period. This was the calculated amount of potassium hydroxide needed to hydrolyze 2.8 of 3.8 methyl acrylate molecules per molar segment in the prepolymer. The reaction was continued for an additional 1 hour. Then the reaction mixture was cooled to room temperature.

The basic polymer solution was partially neutralized to its pI by adding 1064 g of the acidic ion exchange resin of Example 1. This amount of resin corresponded to 2.20 equivalents of acid per 2.80 equivalents of base. The reaction mixture was stirred for 40 minutes, filtered, and the polyampholite polymer solution was bottled. Total product solution, 2640 g; solids content, 0.174 g polymer/g solution; total polyampholite, 459 g; pI, 4.15. Anal. Found: C, 54.90; H, 7.19; N, 3.05.

EXAMPLE 3

Preparation of (4/1/1) Acrylic Acid/Methyl Acrylate/Dimethylaminoethyl Methacrylate Polyampholite by Continuous Overflow Procedure Apparatus: A jacketed resin kettle reactor was fitted with a nitrogen inlet, thermometer, and thermocouple probe to record the thermal profile of the reaction, a vibromixer stirrer, inlet tubes from monomer, emulsifier, and initiator pumps, and an overflow tube which could be adjusted in height to allow the reaction mixture to overflow at the appropriate level into a product reservoir. The overflow tube for this reaction was set to accommodate a 500 ml hold-up volume. Monomer, emulsifier and initiator solutions were pumped into the reactor from separate reservoirs.

Emulsifier Solution: The emulsifier solution consisted of a mixture of 30 g of a phosphate ester anionic surfactant in acid form, pH=5.0, 30 ml of DMAE and 3000 ml of distilled water.

Initiator Solution: The initiator solution consisted of potassium persulfate, 5.0 g, dissolved in 250 ml of water.

Precharge Balance Monomer: A molar ratio of 9.6/1.0 of methyl acrylate/dimethylaminoethyl methacrylate was employed.

Feed Monomer: A molar ratio of 5.0/1.0 of methyl acrylate/dimethylaminoethyl methacrylate was employed.

Feed Pump Rates: The following initial pump rates were employed: monomer pump=5.34 ml/min; initiator pump=1.85 ml/min; emulsifier solution pump=12.44 ml/min.

Procedure-Polymerization: Emulsifier solution, 500 ml, was charged to the reactor. The remainder of the emulsifier solution was placed in the preheated reservoir. The reactor was heated to 65°. Feed monomer was placed in the monomer reservoir. The initiator solution was placed in the initiator reservoir.

When the temperature of the emulsifier solutions in the reactor and reservoir stabilized, the initiator pump was started and allowed to run for 10 minutes to allow a stabilized radical concentration to be established in the reactor. Potassium persulfate reacts rapidly with DMAE as a redox coupled to produce radicals at a rate which is several orders of magnitude faster than through direct thermal decomposition of persulfate.

The reaction was started by injecting 35 ml of the precharge monomer to saturate the emulsion solution with monomer having a ratio of acrylate/methacrylate necessary to produce prepolymer with the desired 5/1 composition. This injection was immediately followed by the start of the monomer pump feeding monomer plus a small amount of precharge balance monomer. The rate of feed of monomer is equal to the rae of polymerization to form product for the specific conditions of the particular reaction and monomer combination. The emulsifier pump was started simultaneously with the monomer pump at a rate selected to maintain an emulsifier solution/monomer solution ratio of 2.33/1. This ratio produces a 25% solids level of polymer in the product emulsion. The reaction was followed by monitoring the thermal profile of the reaction using a thermocouple probe and a stripchart recorder.

The reaction temperature rose to 68° within 6 minutes after start of the reaction and it then leveled off and dropped slightly. An injection of 0.5 ml of methyl acrylate to the reactor helped to stabilize the temperature during polymerization. A thermal plateau was maintained until monomer solution in the reservoir had been depleted. A rapid decrease in temperature indicated that polymerization was complete.

The produce was collected in four fractions. The first was taken during establishment of the thermal plateau and the time period during which the solids level was increasing to 25%. This was equal to 22 minutes, the turnover time for the holdup volume of the reactor at the pump rates used. Fractions 2 and 3 were collected at 50 minutes and at the end of monomer addition, respectively. Fraction 4 was the emulsion which remained in the reactor at the completion of the polymerization.

Each fraction of product emulsion was coagulated by adding acetone followed by water. The coagulated product was washed extensively with water. Fractions 2, 3 and 4 were combined and dissolved in 1500 ml of ethanol in preparation for conversion of prepolymer to polyampholite. A total of 2114 g of polymer solution was obtained; solids content, 0.225 g polymer/g solution; total prepolymer, 476 g; infrared analysis showed a monomer ratio of 4.7/1, and C-H-N analysis showed a monomer ratio of 4.82/1 of methyl acrylate/dimethylaminoethyl methacrylate in the polymer: $M_w=19,000$; $M_y=18,000$.

Hydrolysis: The prepolymer solution obtained in the polymerization step was transferred to a 4.0 liter resin kettle reactor fitted with a blade stirrer, a reflux condenser, and a 1 liter addition funnel. The mixture was heated by a constant temperature bath to 78°. To this mixture was added, over a 45 minute period, 174 g of potassium hydroxide (3.12 moles) dissolved in 1000 ml of water. Following this addition, the mixture was heated for 1 hour and then cooled to room temperature. The basic polymer solution was partially neutralized to its pI by adding 1069 g of the acidic ion exchange resin used in Example 1. This quantity of resin corresponded to neutralization of 3.0 of the 3.7 moles of carboxylate groups formed during hydrolysis. The reaction mixture was filtered to remove the resin, and the polyampholite polymer solution was bottled and sampled for analysis. Total product solution, 3056 g; solids content (after the solution was concentrated to reduce the alcohol concentration to 12.8%), 0.141 g polyampholite/g solution; pI, 4.05; solution pH, 6.0.

EXAMPLES 4 TO 20

The preparative procedures used in Examples 4 to 20 are summarized in Tables I and II, below. Example 17 was carried out substantially by the process of Example 1; Examples 7 and 9, by the process of Example 2; and Examples 4 to 6, 8, 10 to 16 and 18 to 20, by the process of Example 3. The initiator solution consisted of 3 g of potassium persulfate dissolved in 3000 ml of water except that in Example 7, the amounts were 5 g in 5000 ml; in Example 9, the amounts were 2 g in 500 ml; in Example 17, the amounts were 1 g in 1000 ml; in Example 18, the amounts were 20 g in 300 ml; and in Examples 19 and 20, the amounts were 5 g in 250 ml.

TABLE I

| Ex. | Emulsifier Solution (1) | Precharge Balance Monomer Ratio (2) | Monomer Feed Ratio (3) | Pump Rate ml/min (4) | | |
|---|---|---|---|---|---|---|
| | | | | I | M | E |
| 4 (6) | 15/0/ 3000 | 23/7.4/ 12.3 | 169/100/ 165 | (5) | 1.9 | 8.5 |
| 5 | 15/0/ 3000 | 68.4/0/ 11.6 | 323/0/ 105 | (5) | 2.0 | 6.4 |
| 6 | 30/0/ 3000 | 27.9/0/ 5.1 | 407/0/ 120 | (5) | 1.1 | 3.4 |
| 7 | 25/25/ 2500 | — | 361/0/ 176 | 4 | 0.8 | 3.0 |
| 8 | 30/0/ 3000 | 24.6/0/ 8.6 | 336/0/ 196 | (5) | 1.5 | 4.7 |
| 9 | 25/25/ 2500 | — | 362/0/ 176 | 4 | 0.8 | 3.0 |
| 10 | 15/0/ 3000 | 33.8/0/ 8.8 | 289/0/ 141 | (5) | 1.5 | 6.6 |
| 11 | 15/0/ 3000 | 33.8/0/ 8.8 | 289/0/ 141 | (5) | 1.5 | 6.6 |
| 12 | 30/0/ 3000 | 27.9/0/ 5.1 | 407/0/ 120 | (5) | 1.1 | 3.4 |
| 13 | 30/0/ 3000 | 27.9/0/ 5.1 | 407/0/ 120 | (5) | 1.1 | 3.4 |

TABLE I-continued

| Ex. | Emulsifier Solution (1) | Precharge Balance Monomer Ratio (2) | Monomer Feed Ratio (3) | Pump Rate ml/min (4) I | M | E |
|---|---|---|---|---|---|---|
| 14 | 30/0/3000 | 27.9/0/5.1 | 407/0/120 | (5) | 1.1 | 3.4 |
| 15 | 30/0/3000 | 27.9/0/5.1 | 407/0/120 | (5) | 1.1 | 3.4 |
| 16 | 30/0/3000 | 27.9/0/5.1 | 407/0/120 | (5) | 1.1 | 3.4 |
| 17 | 10/0/1000 | — | 208/0/58 | (5) | — | — |
| 18 | 25/25/2500 | 29.0/0/6.0 | 475/0/169 | 6 | 2.0 | 4.0 |
| 19 (7) | 25/25/2500 | 29.0/0/6.0 | 475/0/169 | 5 | 1.9 | 3.8 |
| 20 (8) | 25/25/2500 | 29.0/0/6.0 | 475/0/169 | 5 | 1.9 | 3.8 |

Notes
(1) The emulsifier solution is stated as the g of phosphate ester anionic surfactant in acid form/ml DMAE/ml distilled water.
(2) The precharge balance monomer ratio is stated as the ratio, in ml, of methyl acrylate/methyl methacrylate/dimethylaminoethyl methacrylate unless otherwise noted.
(3) The monomer feed ratio is stated as the ratio, in ml, of methyl acrylate/methyl methacrylate/dimethylaminoethyl methacrylate unless otherwise noted.
(4) The pump rates are shown for initiator solution (I), monomer solution (M) and emulsifier solution (E).
(5) The initiator solution was combined directly with the emulsifier solution.
(6) A total of 1.5 ml of lauryl mercaptan was added to the feed monomer.
(7) A total of 1.0 ml of lauryl mercaptan was added to the feed monomer and 0.1 ml to the precharge monomer.
(8) A total of 1.0 ml of bromotrichloromethane was added to the feed monomer and 0.1 ml to the precharge monomer.

TABLE II

| Ex. | Prepolymer Hydrolyzed g | Monomer Molar Ratio (1) | KOH g | Acidic Ion Exchange Resin g | Mv | pI |
|---|---|---|---|---|---|---|
| 4 | 398 | 2/1/1 | 104 | 141 | 41,000 | 5.3 |
| 5 | 36.6 | 3/1.46/1 | 11.4 | 56.5 | — | 4.4 |
| 6 | 38.6 | 4/1.28/1 | 14.1 | 52.6 | — | 4.25 |
| 7 | 344 | 2.8/1/1 | 112 | 740 | — | 4.2 |
| 8 | 282 | 2/0.65/1 | 84 | 548 | — | 5.0 |
| 9 | 242 | 2.5/0.7/1 | 78 | 467 | — | 4.5 |
| 10 | 41.9 | 2.0/0.85/1 | 11.7 | 65.0 | 12,000 | 4.7 |
| 11 | 41.9 | 2.85/0/1 | 16.6 | 86.7 | 12,000 | 4.2 |
| 12 | 38.6 | 2/3.28/1 | 7.1 | 39.4 | 10,000 | 4.85 |
| 13 | 38.6 | 2.5/2.78/1 | 8.8 | 52.6 | 10,000 | 4.8 |
| 14 | 38.6 | 3.0/2.28/1 | 10.6 | 52.6 | 10,000 | 4.6 |
| 15 | 38.6 | 4.0/1.28/1 | 14.1 | 52.6 | 10,000 | 4.25 |
| 16 | 38.6 | 5.28/0/1 | 18.7 | 65.7 | 10,000 | 3.9 |
| 17 | 21.8 | 5/1.43/1 | 8.6 | 38.3 | 45,000 | 4.3 |
| 18 | 68.5 | 4/1.2/1 | 22.7 | 116 | 28,000 | 4.0 |
| 19 | 392 | 3.6/1/1 | 141 | 751 | 60,000 | 4.4 |
| 20 | 392 | 3.4/0.7/1 | 141 | 751 | 54,000 | 4.0 |

Notes
(1) The monomer molar ratio is given as the ratio of acrylic acid/methyl (meth)acrylate/dimethylaminoethyl methacrylate in the polyampholite.

EXAMPLE 21

Preparation of (4/1/1) Acrylic Acid/Methyl Acrylate/Dimethylaminoethyl Methacrylate by Direct Polymerization in Acid Solution Apparatus:

A jacketed resin kettle reactor was fitted with a blade stirrer, an addition funnel, a reflux condenser, and a nitrogen inlet. The apparatus was heated by a constant temperature bath.

Procedure:

Water (500 ml) and 17 ml of 70% nitric acid were placed in the reactor and heated to 65°. Dimethylaminoethyl methacrylate (29.6 g; 0.189 mole) was then added, and the solution was mixed to insure complete protonation of the amine groups. A mixture of the other two monomers, acrylic acid (54.2 g; 0.753 mole) and methyl acrylate (16.2 g; 0.188 mole) was then added with stirring. The initiator solution of 1.0 g of potassium persulfate in 100 ml of water was added slowly through the addition funnel over a 2-hr period. Heating was continued for another two hours before the reaction was terminated During the reaction period the mixture increased in viscosity but remained clear.

The viscous polymer solution was diluted with water, and 20% sodium hydroxide solution was added to increase the pH to 4.5 (isoelectric point) to precipitate the polymer The polymer was decanted, washed with water (pH 4.5), and again decanted.

A 17.15 g sample of the 4/1/1 copolymer was dissolved in water, pH 6.0, to give 490 g of solution; solids content, 0.0350 g polymer/g solution; solution pH, 7.3; pI, 4.2.

As noted above, certain of the amphoteric polymers of the invention in which the molar ratio of acrylic acid monomer/dialkylaminoethyl methacrylate monomer is at least 2/1 are useful in increasing the covering power of silver halide photographic emulsions when they are employed as gelatin extenders or replacements for gelatin. The following procedures illustrate this utility by employing the polymers in conventional balanced double jet and two stage single jet precipitation of silver iodobromide crystals. Covering power (C.P.) is defined as optical density divided by developed silver coating weight per unit area, that is, D/M.

PROCEDURE A

Monodisperse silver iodobromide crystals were grown on a 1.5-mole scale by balanced double jet precipitation using the amphoteric terpolymer of Example 4 as a protective colloid. As a control, such crystals were grown in the same manner using gelatin as the protective colloid. The conditions and resultant crystal size in each case are shown in Table III.

TABLE III

| | Gelatin (Control) | Amphoteric Terpolymer |
|---|---|---|
| Quantity | 45 g | 10 g |
| $NH_4OH$ (0.88 s.g.) | 1 ml | 2.25 ml |
| Temperature | 46.1° | 54.4° |
| Crystal Size (number average) | 0.0041 $\mu m^3$ | 0.0042 $\mu m^3$ |

The water soluble salts were removed by coagulation of the emulsions. In the gelatin control, this was achieved by adding a negatively charged polymer, polyvinyl alcohol-o-sulfobenzaldehyde, and lowering the pH to 2-3. After thorough washing, the coagulated material wa redispersed by vigorous stirring at pH 6. In the case of the amphoteric polymer, lowering the pH to 4.8 alone caused coagulation. Redispersion was effected by applying ultrasound at pH 6.

In both cases, the emulsion was prepared in the same way. Gelatin (83 g/mole Ag) was added and the crystals were fogged with cesium thiodecaborane and $Au^{3+}$ at 72° for 2 hours at pH 7.6. The pH was then lowered and surfactant, formaldehyde and a desensitizing dye were added just prior to coating at 2.6 Ag/m² on a gelatin-subbed polyester base. Both emulsions showed direct positive response on exposure, but the crystals containing the amphoteric terpolymer showed significantly higher covering power under three different development conditions as summarized in Table IV.

TABLE IV

| Development Conditions | C.P. (m²/g) | |
| --- | --- | --- |
| | Amphoteric Terpolymer | Gelatin (Control) |
| A (1), 35°, 90 sec, tray | 1.83 | 1.49 |
| A (1), 42°, 20 sec, machine processor | 1.91 | 1.63 |
| B (2), 27°, 90 sec, machine processor | 1.62 | 1.42 |

(1) A continuous tone N-methyl-p-aminophenol sulfate/hydroquinone developer was used.
(2) A lithographic hydroquinone developer was used.

PROCEDURE B

Monodisperse silver iodobromide crystals were grown on a 0.38-mole scale by balanced double jet precipitation using the amphoteric terpolymer of Example 5. The precipitation conditions were identical to those used in Procedure A, and crystals with a number average particle size of 0.0045 μm³ were obtained. Coagulation, washing, and redispersion were carried out as in Procedure A. The amphoteric polymer coagulated at pH 4.0, and vigorous stirring gave complete redispersion. Gelatin was added to the emulsion which was then fogged and coated using the conditions of Procedure A. The emulsion was overcoated with an anti-abrasion layer containing additional formaldehyde. The direct positive emulsion gave a C.P. of 1.79 m²/g when tray-developed with the continuous tone N-methyl-p-aminophenol sulfate/hydroquinone developer used in Procedure A at 35° for 90 seconds.

A control experiment in which the amphoteric terpolymer was replaced with gelatin and the resultant emulsion was identically developed gave silver halide crystals which had significantly lower covering power, namely, 1.37 m²/g.

PROCEDURE C

Monodisperse silver iodobromide crystals were grown on a 1.5-mole scale by balanced double jet precipitation using the amphoteric terpolymer of Example 6 as the protective colloid. The precipitation conditions were identical to those used in Procedure A, and crystals with a number average particle size of 0.0054 μm³ were obtained. The emulsion was coagulated, washed, redispersed, fogged and coated as in Procedure B, and a formaldehyde-containing overcoat was applied. The direct positive emulsion gave a covering power of 1.84 m²/g when developed as in Procedure B. Hence the amphoteric terpolymer-grown crystals, despite their larger size, showed much higher covering power than the gelatin-grown control of Procedure B.

PROCEDURE D

Large silver iodobromide crystals were grown on a 3-mole scale by a two-stage single jet precipitation with physical ripening after each stage using the amphoteric terpolymer of Example 7 as a protective colloid. As a control, such crystals were grown in the same manner using gelatin as the protective colloid. The conditions and resultant crystal size in each case are shown in Table V.

TABLE V

| | Gelatin (Control) | Amphoteric Terpolymer |
| --- | --- | --- |
| Quantity | 40 g | 12 g |
| Temperature | 41° | 42° |
| NH₄OH (.88 s.g.) | 75 ml | 75 ml |
| Ripening Times | 5 & 6 min | 7 & 8 min |
| Crystal Size (volume average) | 0.78 μm³ | 0.85 μm³ |

Coagulation, washing and redispersion steps were carried out as described in Procedure B. Gelatin (87 g/mole Ag) was added and the crystals were digested for 30 min at 69° with gold, sulfur, and thiocyanate sensitizers. Wetting agents and antifoggants were added and the emulsions were coated onto a gelatin-subbed polyester base at a coating weight of 2.9 g Ag/m² along with an overcoat containing formaldehyde and chrome alum hardeners. The emulsions were exposed to Dmax and developed in a Kodak Xomat ® M6-AN automatic processor using Du Pont XMD medical X-ray developer (33°, 19 seconds). The amphoteric polymer-grown crystals showed slightly higher covering power (0.75 m²/g) than the gelatin-grown controls (0.72 m²/g) despite the larger size of the amphoteric polymer-grown crystals.

PROCEDURE E

Large silver iodobromide crystals were grown on a 3-mole scale under the same conditions described in Procedure D using the amphoteric terpolymer of Example 8 or a gelatin control as the protective colloid. Crystals with volume weighted size of 0.38 μm³ were obtained with the amphoteric terpolymer, and crystals of 0.41 μm³ were obtained with gelatin. The emulsions were coagulated, washed, redispersed, and sulfur and gold sensitized as described in Procedure D. They were then coated onto gelatin-subbed polyester base at a coating weight of 3 g Ag/m², and a formaldehyde-containing overcoat was applied. The films were exposed and developed as in Procedure D. The C.P. of the terpolymer-grown crystals was 0.72 m²/g which was slightly higher than the C.P. of the gelatin-grown controls which was 0.70 m²/g.

PROCEDURE F

Large silver iodobromide crystals were grown in gelatin and sensitized as described in Procedure D. A sample (0.23 mole Ag) of this emulsion was split into three equal portions. Nothing was added to portion #1, 1.2 g of extra gelatin was added to portion #2, and 1.2 g of the amphoteric terpolymer of were all coated at 2.9 to 3.7 g Ag/m² onto gelatinsubbed polyester base, and a formaldehyde-containing overcoat was applied. After aging for 10 days to allow hardening of the emulsion layer, the films were exposed to Dmax and developed as described in Procedure D. The C.P. of the various films was measured, and the results are summarized in Table VI.

The results show that addition of the amphoteric terpolymer as a gelatin extender gives a substantial increase in silver halide covering power.

TABLE VI

| Film | C.P. (m²/g) |
| --- | --- |
| #1 - (Control) | 0.65 |
| #2 - (Control) | 0.64 |

PROCEDURE G

Large silver iodobromide crystals were grown in gelatin and sensitized as in Procedure D. A sample (0.18 mole Ag) of this emulsion was split into three equal portions. Nothing was added to portion #1, 1 g of the amphoteric terpolymer of Example 9 was added to portion #2, and 2 g of the same terpolymer was added to portion #3. The emulsions were coated as in Procedure D, and an overcoat layer containing chrome alum and formaldehyde hardeners was applied. The films were exposed to Dmax and developed as in Procedure D. The C.P. of the various films was measured, and the results are summarized in Table VII.

TABLE VI

| Film | C.P. (m$^2$/g) |
|---|---|
| #1 - (Control) | 0.65 |
| #2 - (Control) | 0.64 |
| #3 | 1.00 |

The results show that addition of the amphoteric terpolymer to the medical x-ray emulsion resulted in a significant increase in covering power.

PROCEDURES H-P

Monodisperse silver iodobromide crystals were grown on a 0.38-mole scale by balanced double jet precipitation using the polyampholites listed in Table VIII as protective colloids. In each experiment, 2.5 g of the polyampholite, 0.55 ml of 0.88 s.g. ammonium hydroxide, a temperature of 54°, and a pH of 8.0 were employed for the precipitation. The crystal sizes (number average) obtained, V, are shown in the table.

TABLE VIII

| Procedure | Polyampholite of Example | V, μm$^3$ |
|---|---|---|
| H | 4 | 0.017 |
| I | 10 | 0.012 |
| J | 11 | 0.015 |
| K | 12 | 0.0070 |
| L | 13 | 0.0064 |
| M | 14 | 0.0065 |
| N | 15 | 0.011 |
| O | 16 | 0.014 |
| P | 17 | 0.021 |

While the preferred embodiments of the invention are illustrated by the above, it is to be understood that the invention is not limited to the precise construction herein disclosed and that the right to all changes coming within the scope of the invention as defined by the following claims is reserved.

I claim:
1. Amphoteric polymer derived from:
   (a) 20 to 90 mol percent of acrylic acid units,
   (b) 10 to 30 mol percent of N,N-dimethylaminoethyl methacrylate or N,N-diethylaminoethyl methacrylate units, and
   (c) 0 to 70 mole percent of units from one or more members of the group consisting of $C_{1-8}$ alkyl acrylate, $C_{1-8}$ alkyl methacrylate, 2-hydroxyethyl acrylate, 2-hydroxyethyl methacrylate, 2-hydroxypropyl acrylate and 2-hydroxypropyl methacrylate; said polymer prepared by copolymerizing (a), (b) and (c), in solution, in the presence of a strong acid selected from the group consisting of nitric acid, sulfuric acid and hydrochloric acid, in a quantity sufficient to protonate the amine group of (b), the polymer characterized further by having (i) a molar ratio of (a) to (b) of at least 2 to 1, and (ii) substantially no betaine-type contaminant.
2. Polymer of claim 1 in which the molar ratio of (a) to (b) is at least 2.5 to 1.
3. Polymer of claim 1 wherein the degree of polymerization is about 50 to 300.
4. Polymer of claim 1 wherein the degree of polymerization is about 50 to 300.

* * * * *

UNITED STATES PATENT AND TRADEMARK OFFICE
CERTIFICATE OF CORRECTION

PATENT NO. : 5,011,898
DATED : April 30, 1991
INVENTOR(S) : ROBERT PAUL FOSS

It is certified that error appears in the above-identified patent and that said Letters Patent is hereby corrected as shown below:

On the Title page, item [62], under "Related Applications", delete "4,943,888" and replace with -- 4,749,762 --.

Signed and Sealed this

Eighth Day of June, 1993

MICHAEL K. KIRK

Attest:

Attesting Officer

Acting Commissioner of Patents and Trademarks